(12) United States Patent
Tarasov et al.

(10) Patent No.: US 11,842,840 B2
(45) Date of Patent: Dec. 12, 2023

(54) HYBRID MAGNETIC CORE FOR INDUCTIVE TRANSDUCER

(71) Applicant: GOWell International, LLC, Houston, TX (US)

(72) Inventors: Alexander Tarasov, Houston, TX (US); Ryan Rugg, Cypress, TX (US); Jinsong Zhao, Houston, TX (US)

(73) Assignee: GOWELL INTERNATIONAL, LLC, Houston, TX (US)

( * ) Notice: Subject to any disclaimer, the term of this patent is extended or adjusted under 35 U.S.C. 154(b) by 42 days.

(21) Appl. No.: 17/580,336

(22) Filed: Jan. 20, 2022

(65) Prior Publication Data
US 2022/0148787 A1 May 12, 2022

Related U.S. Application Data

(63) Continuation-in-part of application No. 16/551,371, filed on Aug. 26, 2019, now abandoned.

(51) Int. Cl.
*H01F 27/24* (2006.01)
*H01F 27/30* (2006.01)
*G01N 27/90* (2021.01)
*G01N 27/9013* (2021.01)

(52) U.S. Cl.
CPC ......... *H01F 27/24* (2013.01); *G01N 27/9006* (2013.01); *H01F 27/306* (2013.01); *G01N 27/9013* (2013.01)

(58) Field of Classification Search
CPC ... G01N 27/9006; E21B 47/00; E21B 47/092; E21B 17/1078; E21B 47/12
See application file for complete search history.

(56) References Cited

U.S. PATENT DOCUMENTS

| | | | | |
|---|---|---|---|---|
| 4,097,653 A | * | 6/1978 | Patterson ................. | H01B 1/14 428/689 |
| 5,338,506 A | * | 8/1994 | Friederichs ............. | C22C 29/08 419/36 |
| 5,565,773 A | * | 10/1996 | Inaguma .............. | G01N 27/725 73/779 |

(Continued)

*Primary Examiner* — Jermele M Hollington
*Assistant Examiner* — Zannatul Ferdous
(74) *Attorney, Agent, or Firm* — Barry Choobin; Patent 360

(57) ABSTRACT

An inductive transducer apparatus for testing metallic objects using Pulsed Eddy Current topology. The Apparatus includes a transmitter coil, a receiver coil, and a hybrid core. The hybrid core has a high saturation point which allows the transducer to generate a strong initial magnetic field that may further induce strong eddy currents on the surface of the target capable of penetrating deep into metallic objects under inspection. The hybrid core also has a high permeability which enhances the transducer's sensitivity and allows to maintain high signal-to-noise-ratio and of the received signal associated with Eddy Current magnetic field decaying, thus enhancing the system's performance in environments where reliable quantitative analysis of flaws located deep underneath the surface of metal objects is required. A linearity compensation method may be applied to further enhance the performance of the system.

8 Claims, 12 Drawing Sheets

(56) References Cited

U.S. PATENT DOCUMENTS

| | | | |
|---|---|---|---|
| 2004/0246051 A1* | 12/2004 | Hsu | H03F 3/72 330/252 |
| 2017/0030862 A1* | 2/2017 | Sirois | G01N 27/9006 |
| 2017/0168016 A1* | 6/2017 | Hardy | G01N 27/904 |
| 2018/0038985 A1* | 2/2018 | Yu | G01B 7/06 |
| 2018/0294087 A1* | 10/2018 | Sakai | H01F 27/306 |

* cited by examiner

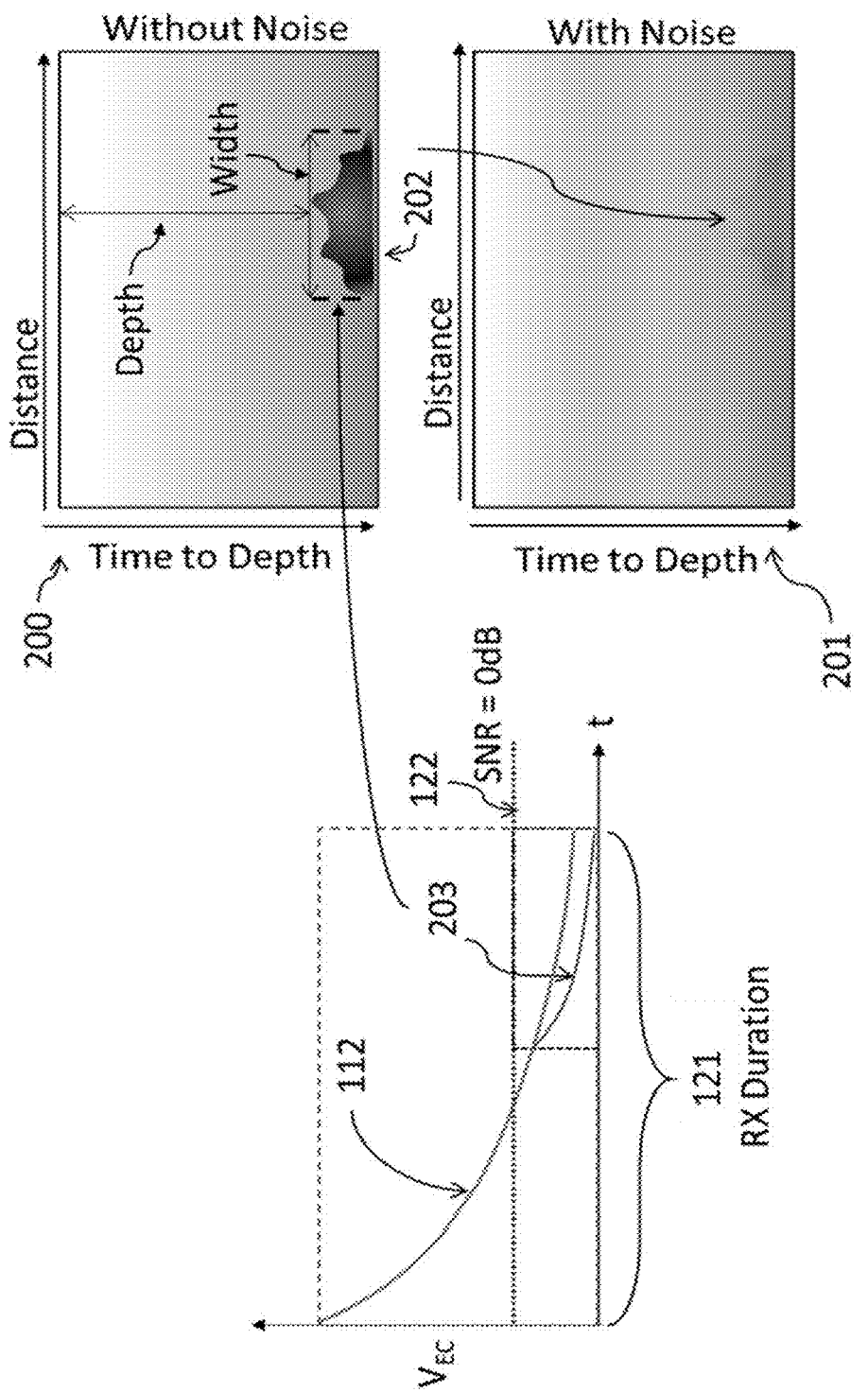

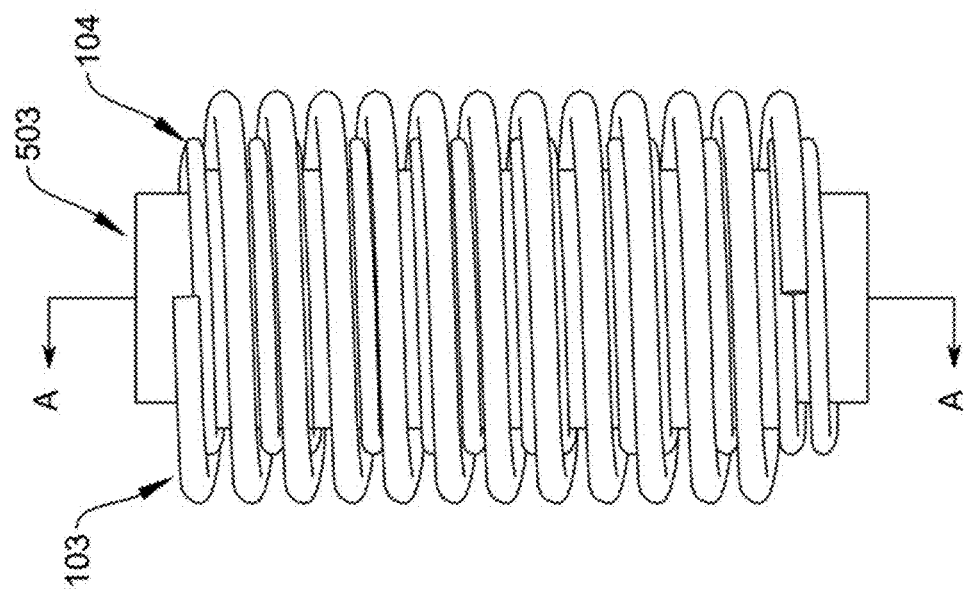
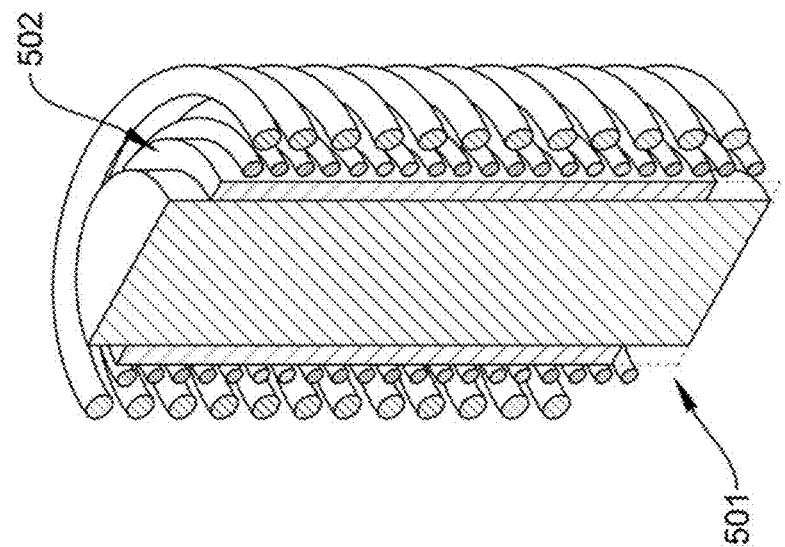
Fig. 5a
Fig. 5b

HYBRID MAGNETIC CORE FOR INDUCTIVE TRANSDUCER

CROSS-REFERENCE TO RELATED APPLICATIONS

This application is a continuation of a U.S. patent application Ser. No. 16/551,371 filed on Aug. 26, 2019, which is incorporated herein by reference in its entirety.

FIELD OF INVENTION

The present invention relates to an inductive transducer apparatus for Pulsed Eddy Current (PEC) testing, and more particularly, the present invention relates to a hybrid magnetic core for the inductive transducer.

BACKGROUND OF THE INVENTION

Eddy Current (EC) testing has been widely used across multiple industries for detecting and quantifying features and flaws on the surface and sub-surface of metallic objects. Conventional EC testing uses inductive transducer scheme with a separate transmitter (TX) coil and a receiver (RX) coil with a fixed spacing in between. EC testing measures far-field EC from the metal target by simultaneously transmitting AC excitation signal from the TX coil and measuring the signal response from the RX coil. One of the main disadvantages of the AC based far-field EC testing method is that the AC signal suffers from Skin Effect, which greatly reduces the transducer's detectible depth in the measurement target.

Another widely used testing method that is more suitable for deep sub-surface detection applications is Pulsed Eddy Current (PEC) testing which relies on the pulse/echo near-field EC measurement principle. Generally, the inductive transducer used in PEC testing method employs at least one TX coil for magnetic field excitation and one RX coil for signal reception from the target. TX and RX coils are generally made from conductive material windings such as copper that are wound around a ferromagnetic core. The ferromagnetic core is used in the PEC transducer to boost the excitation magnetic field hundreds of times as compared to the air-core (coreless) based inductive transducer with the same amount of excitation power in the TX coil. Likewise, the ferromagnetic core plays an important role for the RX coil as it boosts the receiving side signal sensitivity by hundreds or even thousands of times compared to the air-core based inductive transducer. During the excitation cycle, the TX coil establishes an initial magnetic field in the surrounding environment and the target by exciting the coil with a certain amount of current. After reaching the state of a stable magnetic field (DC field), the current from the TX coil is switched off. The sudden change of the magnetic field equilibrium induces EC on the surface of the conductive measurement target. The EC on the target in turn produces a changing magnetic field which is then picked up by the RX coil and output as a voltage signal. As the EC spreads on the surface of the target, it penetrates deeper into the conductive material and continues producing changes in the magnetic field, which induces secondary EC that penetrates deeper and further under the metal surface of the target. Over time, the EC strength is gradually reduced due to the resistance inside the metal body. As a result of the EC dissipation inside the metal target, the strength of the associated magnetic field reduces over time along with the depth traveled. The process continues until all EC energy is burned out and no further magnetic field change is produced in the target. This process is known as EC diffusion and damping.

As the magnetic field from EC decays over time, the RX coil constantly senses the decaying magnetic field and produces a voltage output in response as a measurement signal. This voltage signal can then be interpreted as resistivity changes in the metal target along with time that corresponds to the detection depth. Through the means of post-processing, such information about resistivity changes can then be used to identify various properties and/or flaws on the surface of the target as well as along its depth under the surface of the metal target. Depending on the application, the signal dynamic range from the target can reach over −120 dB. As EC penetrates deeper into the metal target, the signal received by the RX coil becomes smaller and less sensible by the core of the inductive transducer. The sensitivity of the transducer drops along time due to the core's permeability value which decreases with the EC magnetic field strength decrease. This results in a low signal-to-noise ratio (SNR) of the measurement voltage signal, and the decaying signal can no longer be sensed due to the presence of measurement system noises. There are two main factors that impact the SNR and thus the ability to detect signals corresponding to the target's features deep inside the metal body and far away from the RX coil—the ability of the TX coil to provide high initial charging magnetic field energy, and the ability of the RX coil to have enough sensitivity and SNR to sense the EC decaying signal over time. The high saturation point of the ferromagnetic core is crucial in achieving high initial magnetic field during charging time, which is crucial for remote deep detection applications. The ability of the RX coil to sense decaying magnetic field and produce voltage response with a high enough SNR and sensitivity also depends on the transducer's ferromagnetic core properties. One of the main core properties that affects the sensitivity of the transducer is the core's permeability value, which decreases along with the strength of the magnetic field inside the core which corresponds to the EC decaying inside the metal target along time. Therefore, to have a more sensitive RX coil, a high permeability core is required. While other transducer parameters can also be modified for higher sensitivity response such as maximizing the number of RX coil turns and increasing core section area, having a high permeability core is of the utmost importance.

The main challenge that most PEC transducer designs face is the fact that while many existing ferromagnetic cores satisfy the requirements for transmitting pulse having high saturation point for high initial magnetic field generation, they achieve so at the cost of low permeability value, which results in poor SNR and sensitivity during the EC signal acquisition. It results in an inability of reliable deep flaw detection and thus reduced range of applications where such a transducer can be utilized. On the other hand, ferromagnetic cores that possess high permeability have considerably low saturation point and are, therefore, unable to establish strong enough initial magnetic field and EC that is capable of penetrating deep underneath the surface of the target.

Consequently, there currently exists an industry need for a new core for an inductive transducer that has a high saturation point as well as results in high SNR and sensitivity in deep flaw detection inside metal objects.

BRIEF SUMMARY OF THE INVENTION

The following brief summary gives an outline of the preferred embodiments of the present invention so that the detailed description presented later will be better understood. The sole purpose of this summary is to present the concept of the invention in a simplified form, and not to identify any specific elements or key functions of the preferred embodiments.

It is an object of the present invention to provide the solution to the challenges described above by developing a PEC inductive sensor apparatus that incorporates a novel hybrid core configuration to enhance the performance of the transducer for deep and distant feature detection of the surrounding metal target.

It is another object of the present invention to provide an inductive sensor apparatus whose core has a high saturation point to allow strong initial magnetic field generation for the TX coil.

It is another object of the present invention to provide an inductive sensor apparatus whose core has a high permeability value and thus can maintain high SNR and sensitivity across a wide dynamic range for RX coil signals.

It is another object of the present invention to provide a method that provides higher linearity for the response signal.

In one aspect, disclosed is an inductive transducer apparatus that is utilized for testing metallic objects. The disclosed apparatus contains a TX coil and RX coil wound on a hybrid core.

In one aspect, disclosed is a hybrid core that enhances the inductive transducer's response by providing a higher initial magnetic field during the transmitting period and providing higher sensitivity and SNR of the signal during the receiving period. The TX coil is separate from the RX coil.

In one aspect, a circuit that contains a current source to supply the TX coil with programmed current as well as the controllable switch to regulate the said current flow is connected to the TX coil. A circuit that contains analog and digital networks necessary to receive, scale and process the voltage generated by the EC-corresponded magnetic field is connected to the RX coil. Both the TX coil and the RX coil can be positioned separately along the core but can also be overlapped with each other in separate layers over the core depending on the application needs.

The following has provided a rather brief outline of the features and advantages of the present invention so that the detailed description presented later will be better understood. It should be understood that changes and modifications to the aforementioned embodiments can be made within the scope of the claims presented later. It should also be noted that the embodiments mentioned herein do not depart from the overall scope and purpose of this invention.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

FIG. 2 Illustrates a relationship between received voltage signal associated with EC magnetic field decaying over time and depth of the material measured as well as the SNR challenges associated with measuring and detecting material's features that are deep and far away from the transducer.

FIG. 5a shows an inductive transducer with a hybrid core, according to an exemplary embodiment of the present invention.

FIG. 5b is a section view of the hybrid core shown in FIG. 5a taken along line A-A, according to an exemplary embodiment of the present invention.

DETAILED DESCRIPTION OF THE INVENTION

Figure 1A:
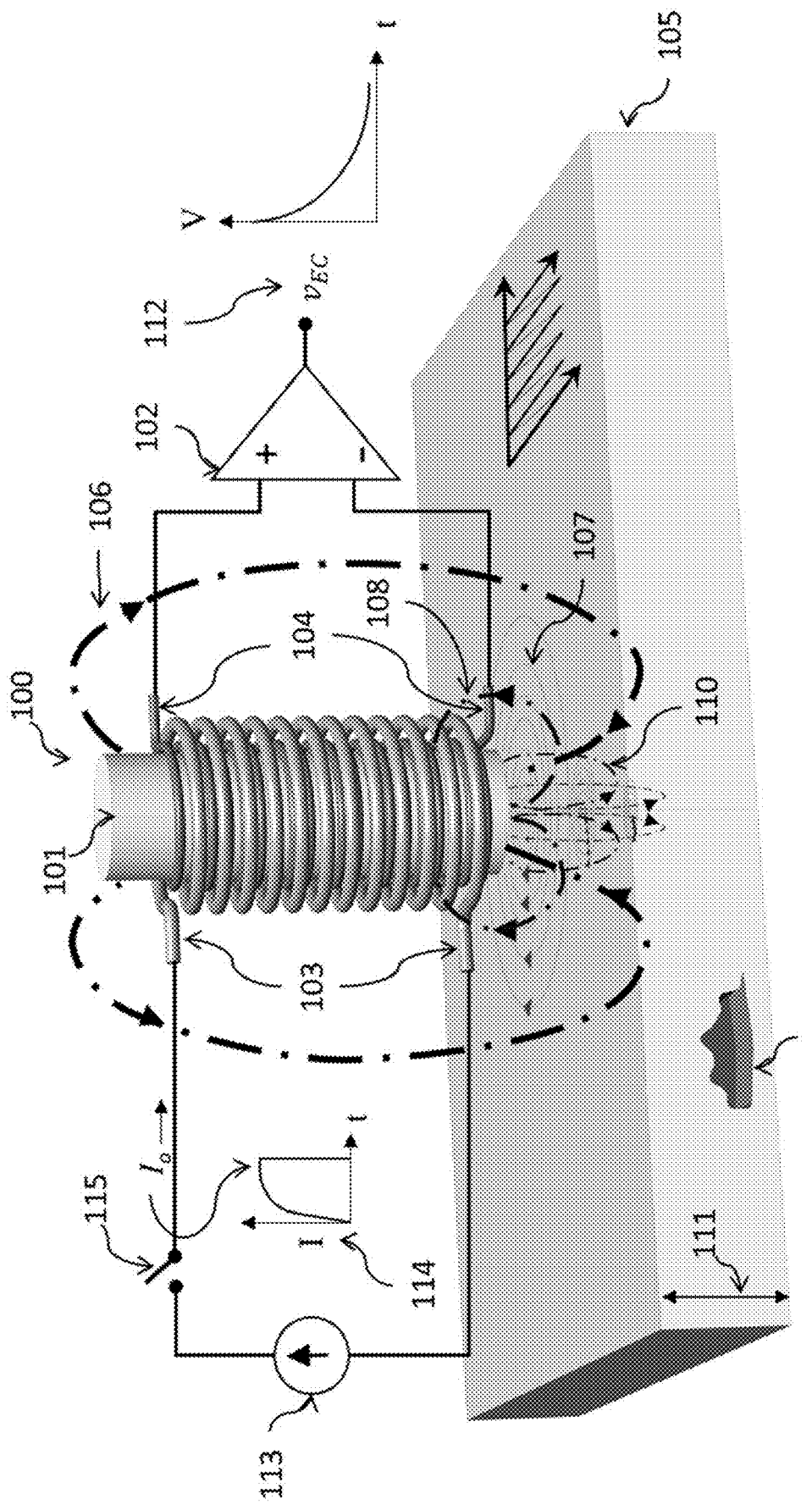
FIG. 1a illustrates a principle and operation of the PEC measurement, known in the art.

The subject matter will now be described in detail and will reference the accompanying drawings to enhance the understanding of the invention and its benefits. This description should not be viewed as limiting in any way but merely illustrative of the concept of the present invention. It should be understood that the exemplary embodiments described in this section can be modified within the scope of the claims and thus shall be viewed in a broad scope sense.

The word "preferred" or "exemplary" when referring to the embodiments of this invention is used herein only to indicate a particular arrangement or configuration being described. Any embodiments that are described here as the "preferred embodiments" should not be viewed or construed as better or more advantageous over other embodiments.

The specific terms and phrases used herein are solely used for the purposes of describing the present invention and are not intended to be limiting of the embodiments of the invention. As an example, singular forms "a", "an", and "the" also mean to include plural forms when describing certain features and drawings of the preferred embodiments, unless clearly stated otherwise. In addition to this, the use of specific terms when describing features of the preferred embodiments does not preclude the modifications or additions of new features, methods, or components to the already existing embodiments without departing from the scope of this invention. This description is only meant to aid in explaining the invention concept and should not be viewed in a limiting sense. The scope of the invention will be best defined in the claims section of the patent.

Disclosed is an apparatus and method for evaluating metallic objects using the PEC testing method. Also, disclosed is a hybrid core for an inductive transducer that has a high saturation point and permeability for achieving high magnetic strength, and high sensitivity and signal-to-noise ratio. The disclosed apparatus may include a transmitter (TX) coil, a receiver (RX) coil, and the disclosed hybrid core. The TX coil may generate the initial magnetic field by being excited with a predefined amount of current and switching it off at the end of the transmitting period, thus inducing eddy currents on a surface of the metallic object. The receiver coil may generate a voltage signal in response to the magnetic field generated due to the eddy currents and change in the magnetic field. This voltage signal can then be further analyzed in a post-processing domain to reveal the features of the metallic object such as material thickness or defects. The defect can be corrosion in the metallic object.

In certain embodiments, the hybrid core may include two or more structural members that together form the hybrid core. The structural members may juxtapose to each other, such as each structural member can be in contact with at least one another structural member. The structural members may also be integrally forming a single unit. The structural members can be composed of different magnetic materials, wherein the choice of magnetic materials can be such that the hybrid core has high saturation and permeability, resulting in the detection of flaws in the metallic object with high signal-to-noise ratio and sensitivity. In one case, the core can have two structural members, where a first structural member can be made from a magnetic material with high saturation and another structural member can be made from the magnetic material that has high permeability. Thus, two or more structural members made from different magnetic materials, wherein the arrangement of the two or more structural members and the choice of the magnetic material can be made based on the desired properties of the hybrid core. The hybrid core can be customized and optimized based on the requirements using different combinations of structural members. Suitable algorithms can be made using the physical and magnetic properties of the known magnetic materials for implementing combinations of the structural member to achieve desired properties, features, or measurements. A variety of magnetic materials including composites are known in the art and any such material known to a skilled person having magnetic properties can be used without departing from the scope of the present invention.

The disclosed hybrid core may enhance the sensor's behavior by having a high saturation point for the excitation period of the TX coil which increases the initial charging magnetic field. The hybrid core may also improve the sensor's receiving characteristics by boosting the SNR and sensitivity of the RX coil and thus enhancing the ability to sense very small changes in the decaying magnetic field from the target.

FIG. 1a depicts a general inspection apparatus used in PEC testing and its measurement environment all known in the art. The inductive transducer apparatus 100 has a TX coil 103, an RX coil 104 and a ferromagnetic core 101. The transducer 100 is positioned near the metallic target 105 with a certain thickness 111. The transducer can be used to measure features or flaws 109 within layers of a target metallic object at various depths. The transducer 100 and target 105 may be stationary or moving with respect to each other in the direction of the scan during measurement. The target 105 may be any metallic object including, but not limited to plates, pipes, beams, and vehicles.

The TX coil 103 is connected to the current source 113 that is used to excite the coil, by switching on 115, with a predefined amount of current 114. When current $I_0$ 114 is applied to the TX coil 103, magnetic field $B_0$ 106 is established in response to increasing current on the TX coil 103. After a certain time-interval, the current 114 stabilizes and the magnetic field 106 reaches a steady-state. The current is then removed from the TX coil 103 by turning off the switch 115, which causes the DC magnetic field 106 to collapse. The sudden change in the magnetic field induces EC 107 on the surface of the metallic object 105. The EC flowing on the surface generates the opposite polarity changing magnetic field 108 which is then sensed by the RX coil 104 that develops a voltage signal across its output in response to EC-related magnetic field changes. The output of the RX coil 104 is then connected to an appropriate electronic network 102 comprising analog and digital circuitry such as a differential amplifier, analog filter, ADC, and other elements to process, scale, and output the continuous voltage signal 112. The inductive transducer 100 and all the functional circuitry networks connected to the transducer 100 are called measurement system, which is built by various electrical components that are the sources of the measurement system noises added into the measurement signal. The changing EC magnetic field 108 induces secondary EC that penetrates beneath the surface of the metallic object 105. The secondary EC continues generating a magnetic field 110 deep inside the target 105 which decays due to EC damping and diffusion. This process of decaying EC energy and its corresponding magnetic field repeats and keeps going until all the energy drains over time along with the depth traveled inside of the material 105. The voltage generated by the RX coil 104 also decays along with the time and depth of travel of the Eddy Current as seen in 112 until it is no longer measurable. At the time, the one-round signal detection period is over, and the same sequence of steps may be repeated as the target is being scanned and combined to obtain precise information about the target 105.

Figure 1B:
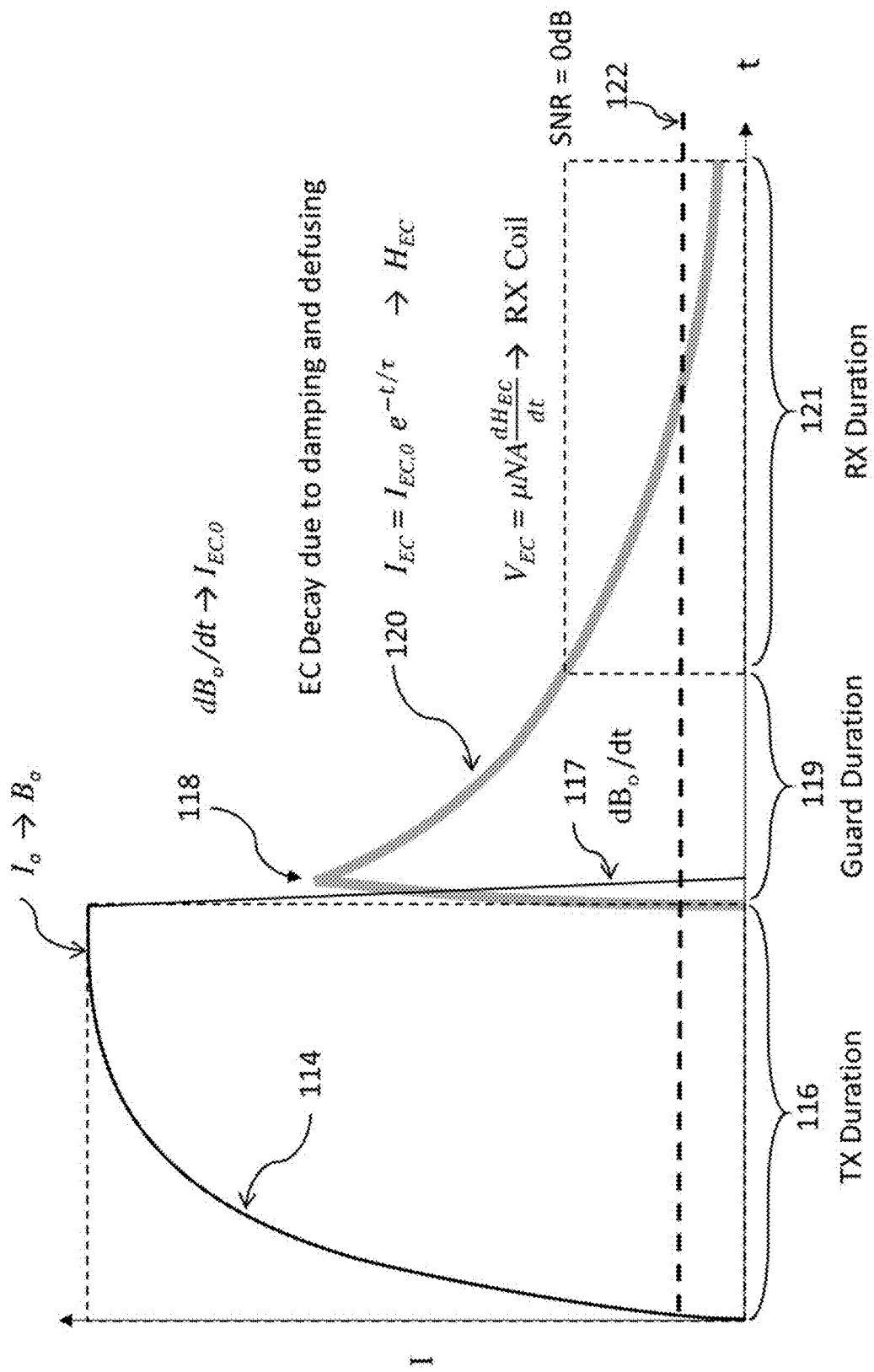
FIG. 1b illustrates the operation scheme with charging current for TX duration, switching off, and the EC decaying signal acquisition in RX duration, known in the art.

FIG. 1b graphically illustrates the pulse/echo periods of the PEC detection sequence, so called operation scheme as well. The graph illustrates the charging/excitation period as TX duration 116 of the TX coil 103 and the acquisition/measurement period as RX duration 121 of the RX coil 104. During the TX duration 116, the current 114 begins and gradually increases in the TX coil 103, which generates the initial magnetic field $B_0$ that sets up around and in the metallic target 105. When the charging current $I_0$ gets stabilized, the magnetic field $B_0$ reaches the steady-state value. At that moment, the equilibrium state is reached where the magnetic $B_0$ field is constant, and no EC exists on the surface of the target 105. The charging current $I_0$ is then removed from the transmitter coil 103 as illustrated in 117 which results in the initial magnetic field collapsing. This changing magnetic field $$\frac{dB_0}{dt}$$

induces initial EC $I_{EC,0}$ 118 that begins to flow in the circular pattern as shown in 107 on the surface of the target 105 and decays over time as it diffuses inside the target 105 as shown in the EC decaying curve 120. Decaying EC produce a voltage response across the RX 104 coil according to Lenz's law $$v_{EC} = -NA\frac{dB_{EC}}{dt} = \mu_C NA\frac{dH_{EC}}{dt} \quad (1)$$

and $$B_{EC} = \mu_C H_{EC}$$

where $v_{EC}$ is the voltage output representing decaying EC magnetic field, N is the number of turns of the RX coil 104, A is the section area of the ferromagnetic core 101, $B_{EC}$ is the magnetic field in the core, $H_{EC}$ is the magnetic field strength generated by the EC from the target 105, and $\mu_C$ is the permeability of the core 101. Along with time and depth inside the target 105 as EC decays, the corresponding sensed voltage signal $v_{EC}$ reaches the noise floor 122 of the measurement system, where SNR=0 dB. The sensitivity of the measurement signal, corresponding to the $H_{EC}$ from EC decaying, at and below the noise level 122 is very low as the added noise becomes dominant in the measurement signal $v_{EC}$ and the sensor's response to $$\frac{dH_{EC}}{dt}$$

is weak. The EC decaying 120 continues further until all EC energy dissipates in the target 105 and no signal voltage would be produced on the measurement signal output except for the system noises. That corresponds to a one round acquisition period 121 of the transducer. The equation (1) shows that among many factors, high magnetic permeability $\mu_C$ of the core plays an important role in SNR and sensitivity of the transducer 100.

As illustrated in FIG. 1b, the signal acquisition-RX duration 121 of the RX coil 104 does not start instantly after the current 114 to the TX coil 103 is turned off. A guard duration 119 may be needed before starting the acquisition RX duration 121. The time gap 119 is needed in order to dissipate and dampen the inductive noises in TX coil due to the charging current being switched off suddenly, which is also known as the switching noise. By mutual inductive processes in between TX coil and RX coil as well as the EC decaying inside the ferromagnetic core, the switching noises will be heavily coupled into and picked-up at the RX coil as the part of the measurement output signal, which does not represent the EC decaying process in the measurement target 105. Meanwhile, as illustrated in FIG. 1b, due to the switching off process 117 to 118, a high EC spike with a peak $I_{EC,0}$ is generated in response to the combination of collapsing initial magnetic field 106 and the magnetic field 108 generated by the EC on the surface of the target 105 that are starting EC decaying process inside the target 105. However, the measurement signal $v_{EC}$ right after the peak $I_{EC,0}$ within the guard time 119 is contaminated heavily with the switching noises. The acquisition period 121 starts after all of the switching noise energy has been dissipated. That can be achieved within the guard duration 119 with passive or/and active electrical damping networks as dictated by engineering designs.

Figure 1C:
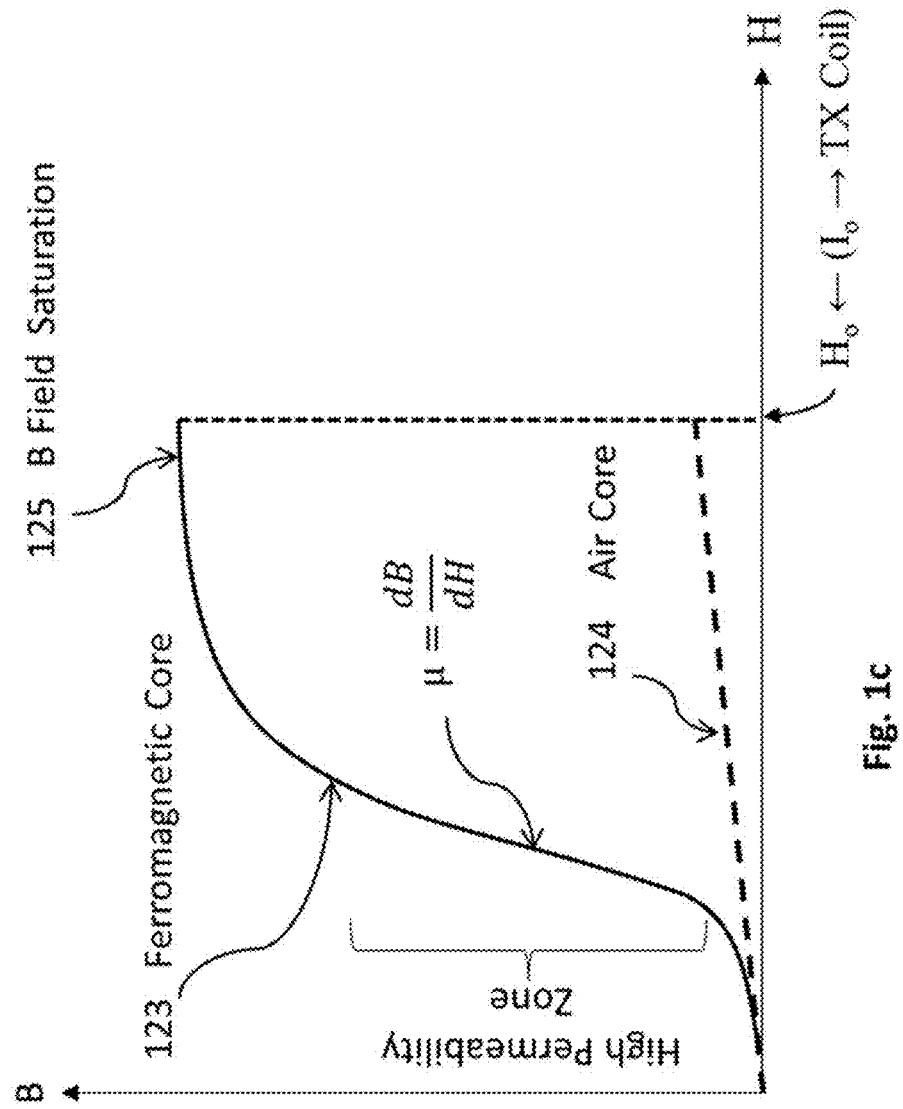
FIG. 1c shows the concept of B-H curve for ferromagnetic core vs. air core, known in the art.

FIG. 1c illustrates behavior differences between two inductive transducers when the current is applied to the TX coil and the respective magnetic field is generated, with one using the air core (coreless) and the other one using ferromagnetic core, respectively. It illustrates the advantages of the ferromagnetic core that provides a much higher initial magnetic field $B_0$ on the target 105 compared to the air-core based transducer given the same amount of magnetic strength $H_0$ produced by the current $I_0$ applied to the TX coil 103, governed by B-H curve shown in 123 for ferromagnetic core and in 124 for air-core. For both the air-core and ferromagnetic core-based inductive transducers, the $B_0$ field response follows Ampere's law:

$$\oint_l B_0 \cdot dl = \mu_S I_0 N \quad (2)$$

where, $I_0$ is the amount of current applied to the coil, $B_0$ is the established initial magnetic field due to the current applied, N is the number of turns of the TX coil, and $\mu_S$ is the relative saturation permeability.

All the ferromagnetic materials have a saturation region 125 which is a region where increase in the magnetizing force $H_0$ no longer produces an increase in the $B_0$ field as the core saturates. Thus, a high saturation point ferromagnetic material is required to produce strong initial magnetic field $B_0$ 106. For air-core, there is no saturation permeability so that its $\mu_S$ is the same as the permeability $\mu_C$, defined as the derivative of B-H curve in following, $$\mu = \frac{dB}{dH} \quad (3)$$

The slope of B-H curve of an air-core is constant and has a considerably small value, but its magnetic field is linearly increased with the increase of $I_0$ value. In contrast, as shown in FIG. 1c, even though it can be saturated, the ferromagnetic core still has much higher $\mu_S$ that allows the boost of the magnetic field $B_0$ by hundreds or even thousands of times as compared to that of the air-core given the same excitation current $I_0$. It is possible to achieve the same level of the $B_0$ field by applying a much higher current to the TX coil on the air core transducer. In practice, it is difficult to do so as the driving current $I_0$ must be increased by several hundred or even thousands of times, which presents various engineering limitations.

FIG. 2 illustrates challenges that are associated with sensitivity and SNR of PEC transducers when measuring features/flaws buried deep within the target 105. The relationship is presented in decaying voltage 112 along the time on the RX coil 104, correlating with detection of material flaws such as fractures 109 buried deep inside the target 105. As EC penetrates inside the target 105 and propagates circularly, as shown in 107, through the material's finite resistance $R_{EC}$, it dissipates EC energy according to the Ohm's law in $I_{EC}^2 R_{EC}$. When the EC reaches the region of defect 109 located deep beneath the surface of the target 105, the resistance $R_{EC}$ increases in that region due to the presence of the defect/flaw 109. The associated EC energy dissipates faster and thus, EC decaying is faster in that region than the region without the defect 109. As the result, the received voltage signal $v_{EC}$ 112 developed on the RX coil 104 decreases faster in that region of defect as shown in 203, as compared to the nominal region with no defects. The changes can then be analyzed in the post-processing domain to convert the time units of the decaying signal $v_{EC}$ 112 into the depth units of the target 105 along with specific information about the defect 109 such as its width and depth as shown in 202. The conversion of the received information from the time domain of the signal to depth domain inside material is known as the B-mode scan shown in 200 and 201. As the flaw 109, shown in B-mode scan 200 and 201 and the corresponding signal 202 and 203, is located deep inside the metallic target 105, the location of detection corresponds to the later time of the acquisition window 121, which also corresponds to the region where the transducer SNR is low after a long time EC decaying and strong EC energy dissipation resulting in the weak EC associated magnetic field response. In an ideal measurement environment without the presence of system noises 122, the flaw signal 202 can be easily identified and analyzed, as illustrated in 200. However, in real-world applications, the noise from the measurement system 122 becomes the dominant factor when dealing with low SNR and low sensitivity signals 203 and 202. It is almost impossible to sense and analyze the signal as illustrated in 201, which is the case when the measurement system noises are present. Disclosed is an improved transducer that can maintain positive SNR and high sensitivity across the full dynamic range of the acquisition signal 112 in the RX duration 121 for PEC applications.

Figure 3:
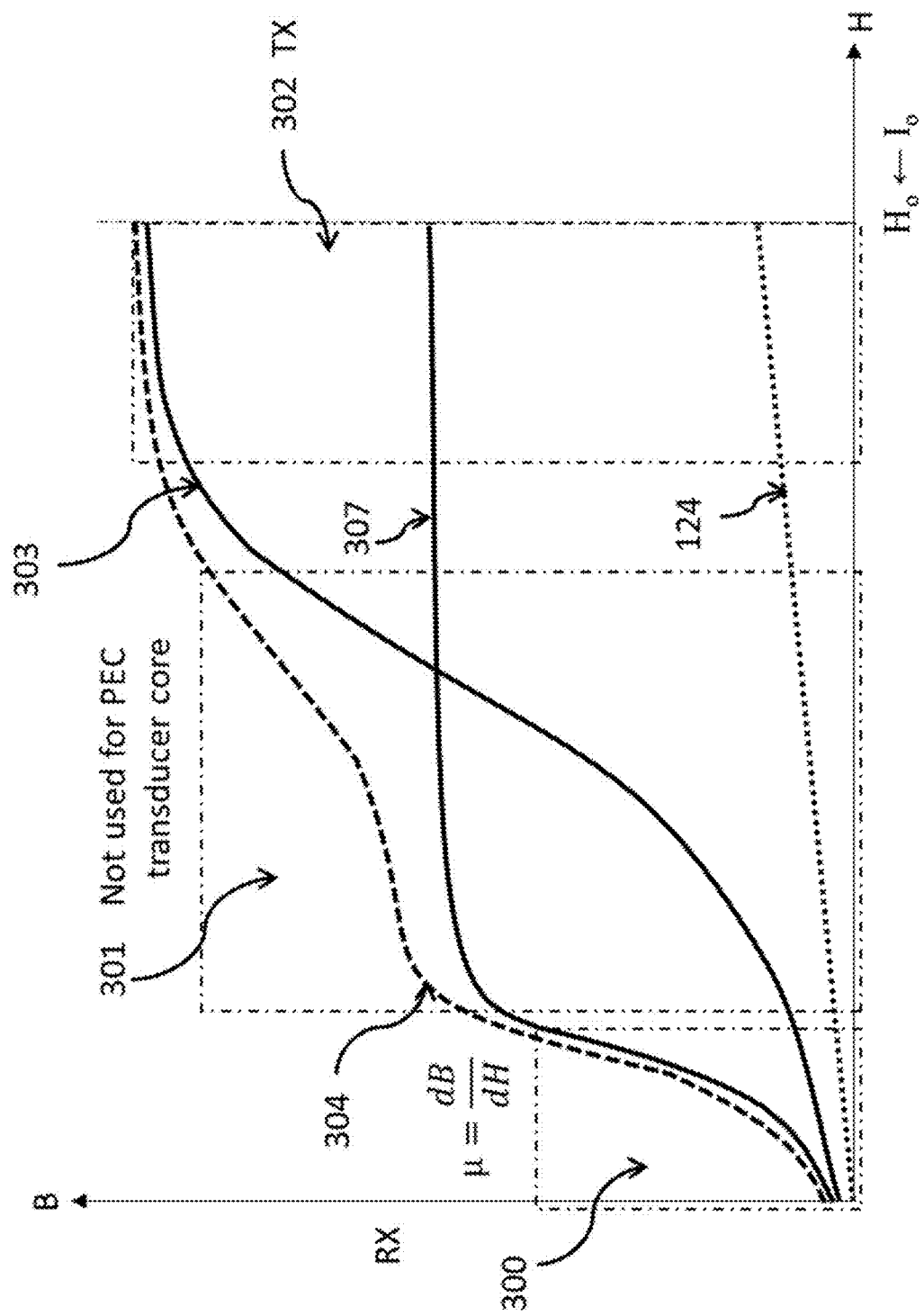
FIG. 3 further illustrates typical B-H curves of common ferromagnetic materials and points out the main limitations of these materials such as saturation points and permeabilities. It also illustrates, in the dash line, the B-H curve characteristics that would be ideal for a ferromagnetic core used in the PEC transducer if such a material with these characteristics existed.

FIG. 3 illustrates typical B-H curves for common ferromagnetic materials that normally comprise the transducer's core structure. The B-H curve illustrates the magnetization properties of ferromagnetic materials as a function of magnetizing force H applied versus the resultant magnetic field B. As mentioned, for PEC applications, a transducer's ferromagnetic core should possess the properties of high saturation point in order to deliver higher initial magnetic field 106 for the same amount of charging current 114 as well as high permeability value in order to have high SNR and sensitivity for deep detection applications. A conventional transducer ferromagnetic core cannot deliver both characteristics simultaneously. A B-H curve 303 illustrates a property of a common ferromagnetic material. Such a material may possess a high saturation point in the TX region 302 which would provide a strong initial magnetic field 106 during the charging period. However, its material properties result in a steep roll-off in the transition region 301 as the magnetizing force decreases. As seen, for the RX detection region 300, this core material possesses low magnetic field permeability $\mu_C$, defined in equation (3), resulting in low SNR and sensitivity of $v_{EC}$ 112, and thus not being able to detect features deep inside the target 105.

A B-H curve 307 in FIG. 3 depicts characteristics of another ferromagnetic material. This ferromagnetic material may possess a sensitive response because of high permeability $\mu_C$, defined in the equation (3), within the region 300 which corresponds to the $B_{EC}$ field response deep inside the metallic object 105. However, such a material may not possess a high-enough saturation point for the TX charging period 302, which would lead to lower initial magnetic field 106 due to the early $B_0$ field saturation. The low saturation point of the ferromagnetic core may lead to a reduction of the initial EC strength $I_{EC,0}$ 118, and thus inability of EC 107 to penetrate deep enough to reach the defect 109 before being dissipated to an undetectable level.

A B-H curve for the air-core based transducer is illustrated in 124 for reference. The air-core transducer possesses neither a high saturation point for the TX region 302 nor high permeability $\mu_C$ for high SNR and sensitivity for the measurement signal $v_{EC}$ 112 in the RX region 300 and is normally not employed in PEC transducers.

A B-H curve 304 illustrates idealized core characteristics that would be optimal for PEC to detect the flaws and features deep beneath the surface of metal target 105. To achieve a reliable quantitative analysis of features, high saturation point in the region 302 for the TX charging period along with high permeability $\mu_C$ and thus high sensitivity and positive SNR of $v_{EC}$ 112 across the acquisition RX region 300 would be demanded as transducer's core B-H curve properties. If the combination of both properties could be properly achieved, the transducer's core 101 would enhance the performance and allow the RX coil 104 to remain highly sensitive while keeping the signal above the 0 dB SNR level 122 across the entire acquisition region 300 while also possessing high saturation point which would yield strong magnetizing energy during the TX charging 302. In general, the transition region 301 on B-H curve is not used for PEC transducer and its applications.

Figure 4:
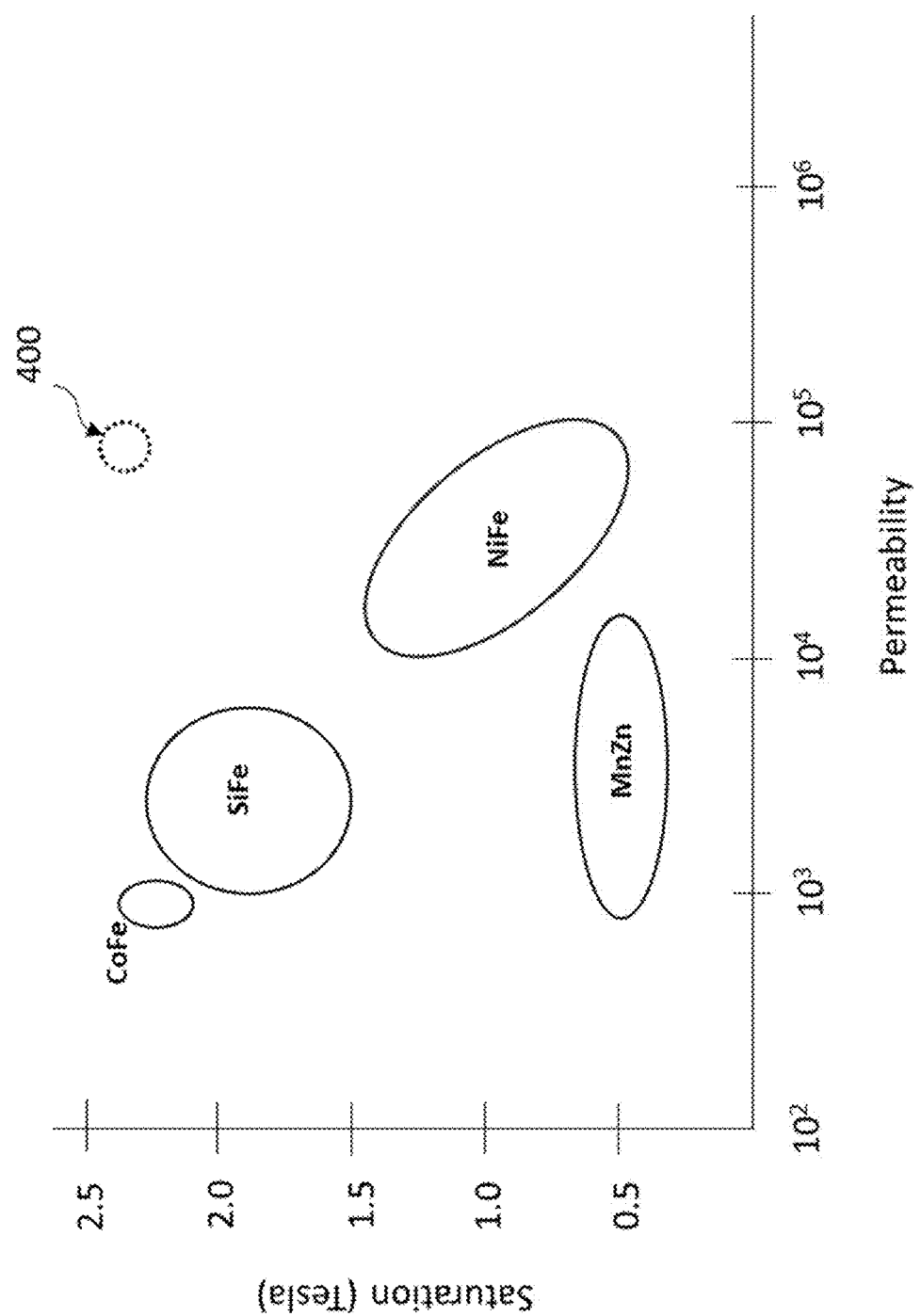
FIG. 4 is a graph depicting the typical relationship between saturation point vs permeability for existing ferromagnetic materials based on their material properties.

FIG. 4 illustrates physical limitations for achieving the goal of having both high saturation point and high sensitivity in single-material core transducers. The graph illustrates properties of ferromagnetic materials that comprise conventional PEC transducer cores as a function of their permeability (relatively from $10^2$ to $10^5$) vs saturation point (from 0.5 T to 2.5 T). As can be seen, existing materials that possess high saturation point of around 2.5 Tesla and higher needed for providing strong charging magnetic field 106 such as Cobalt Ferrite or Silicon Ferrite, typically do not possess high permeability values that would result in the decrease of SNR and sensitivity of the transducer for the received signal 112. Conversely, high permeability materials, such as Nickel Ferrite providing high SNR and sensitivity when sensing $$\frac{dH_{EC}}{dt},$$

have relatively low saturation point which means that strong magnetic charging field 106 is not achievable, which further leads to an inability of EC 107 to penetrate deep enough into the target 105 before being dissipated. The dashed region shown in 400 indicates ideal non-existent ferromagnetic material properties that could possess both high saturation point and high permeability, resulting in the best sensor response in PEC applications.

FIGS. 5a and 5b illustrates the preferred embodiments of the present invention that present the solution to the aforementioned challenges. Disclosed is a hybrid core 501 configuration that can enhance the transducer's ability to provide both the high saturation point for generation of a strong initial magnetic field 106 and high sensitivity and SNR of the received signal 112. The hybrid core 501 includes two structural members i.e., an inner solid cylinder 503 and an outer hollow cylindrical shell 502 that encases the inner solid cylinder 503. The outer hollow cylindrical shell 502 could be made from any suitable ferromagnetic compound, with one example being Nickel Ferrite that exhibits high permeability value and provides higher sensitivity and SNR of the transducer during the RX period 121. The inner solid cylinder 503 could be made from any suitable ferromagnetic compound, with one example being Cobalt Iron that possesses high saturation point, thus allowing the generation of strong initial magnetic field 106 for producing much higher and stronger EC to penetrate deeper into the metallic object 105. The suitable ferromagnetic materials may be, but are not limited to steel, permalloy, permendur, or the combinations thereof. It is understood that any known magnetic material can be used for a structural member of the disclosed hybrid core without departing from the scope of the present invention. The TX coil 103 and the RX coil 104 may be wound around the hybrid core. The hybrid core 501 may be embodied in various sizes and shapes depending on the application requirements. The dimensions and geometry of the hybrid core 501 such as its length, width, diameter, or thickness are dictated by specific application requirements and can be determined during the design stage of the inductive transducer 100. Thus, any geometrical combination and proportional ratio of the hybrid core 501 is possible without departing from the scope and purpose of the present invention. Also, as can be seen in FIG. 5b, the outer hollow cylindrical shell 502 is less in size than the inner solid cylinder 503. Because of the huge differences in magnetic field strength level for TX charging and RX acquisition, in general, the portion of hybrid core made of structural member 502 is much less than that of the structural member 503. Thus, the desired characteristic, such as the high saturation and permeability of the hybrid core, can be achieved by the selection of magnetic materials for different structural members, the number of structural members, arrangement of the structural members, and relative size (volume) of the structural members.

When the TX coil 103 is excited with current 114, the initial magnetic field 106 is established around the inductive transducer and in the target 105 through magnetic flux distributions, shown in equation (2). Even though the outer structural member 502 has low saturation point and saturates early during TX charging time, more of the rest of the magnetic flux will flow into the inner structural member 503. Due to the property of a higher saturation point of the inner structural member 503, a stronger magnetic field $B_0$ 106 can be achieved, which results in a stronger EC flowing on a surface of a target once the $B_0$ field is removed at the end of the charging period 116. Therefore, higher saturation point of the inner structural member 503 allows EC 107 to penetrate the full thickness 111 of the metallic object 105 before being dissipated.

During the RX acquisition period 121, the RX coil 104 develops a voltage 112 in response to the $$\frac{dH_{EC}}{dt}$$

from EC decaying inside of the outer structural member 502, shown in equation (1). The outer structural member 502 acts as a transducer gain for the received voltage 112 due to high permeability properties. The high permeability allows the received voltage signal 112 to maintain the higher SNR and increased sensitivity as the voltage signal 112 remains above the system noise floor 122.

Figure 6B:
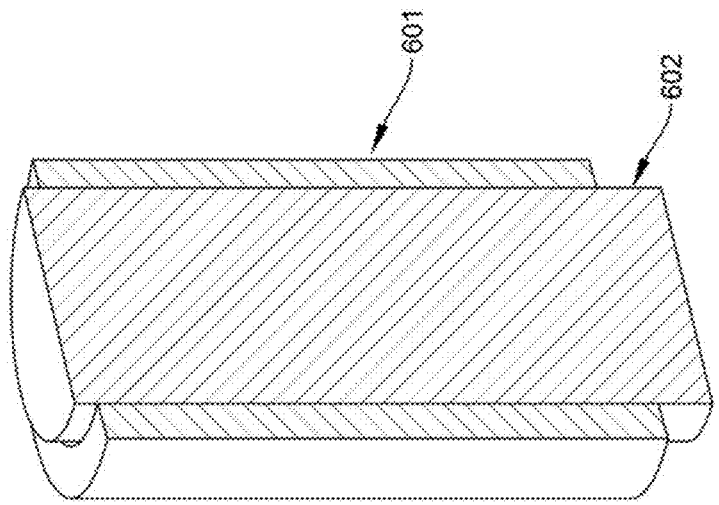
FIG. 6b is a section view of the hybrid core shown in FIG. 6a taken along the line 7-7, according to an exemplary embodiment of the present invention.
Figure 6A:
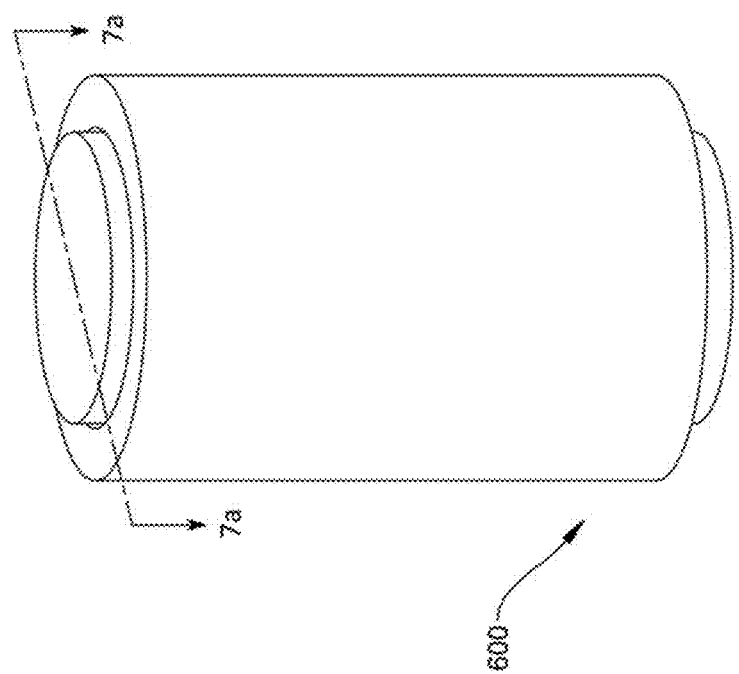
FIG. 6a shows the hybrid core, a transmitter coil and a receiver coil wrapped over the hybrid core, the hybrid core has an outer layer and an inner layer made of different magnetic materials, according to an exemplary embodiment of the present invention.

FIGS. 6a and 6b illustrate the hybrid core as shown in FIG. 5a. Without any limitations, the disclosed hybrid core can be made in various shapes and sizes, and in different combinations to achieve desired performances for the inductive transducer apparatus. As illustrated in FIG. 6b, the hybrid core 600 has a solid cylindrical shape inner structure member 602, that is inserted into another outer structural member 601 that is like a tunnel or shell. The structural members of the disclosed hybrid core can be longer, shorter, wider, narrower or any combination thereof with respect to each other depending on the application requirements.

Figure 6C:
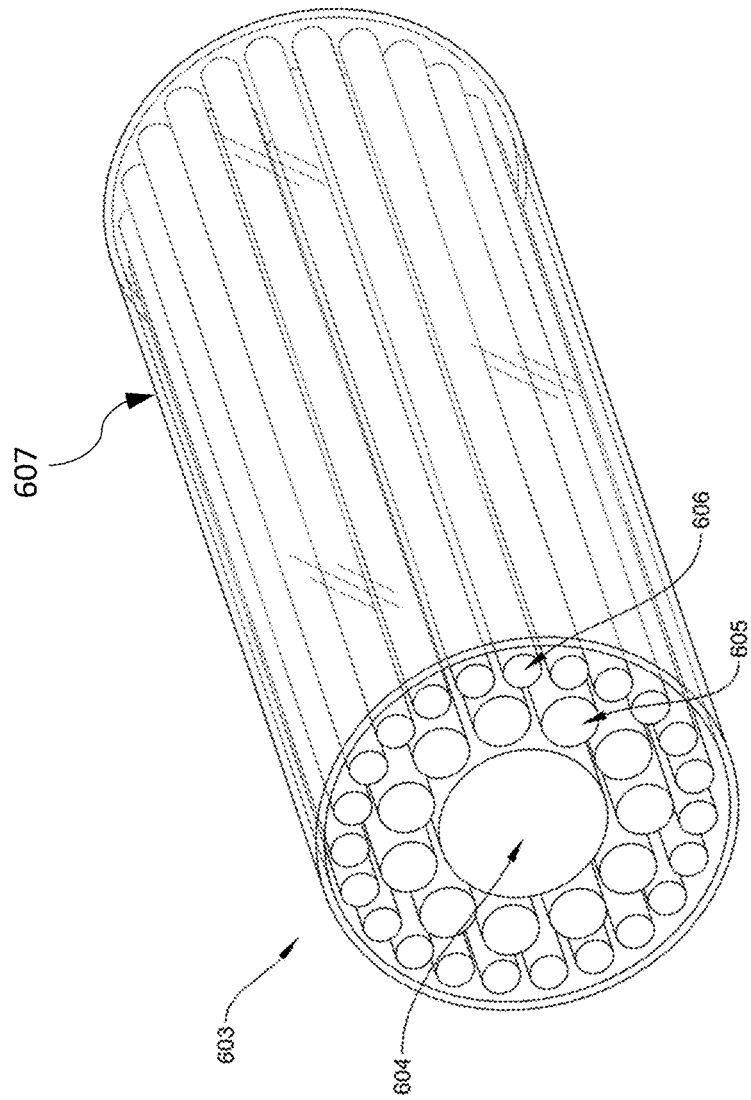
FIG. 6c shows another exemplary embodiment of the hybrid core composed of three structural members made of different magnetic materials, the three structural members are in a form of a hollow cylindrical tube/shell, multiple rods, and a solid cylinder, according to an exemplary embodiment of the present invention.

Referring to FIG. 6c, it shows another exemplary embodiment of the disclosed hybrid core. The hybrid core 603 is shown to have three structural members, the innermost solid cylinder shape structural member 604, a first layer of tubular or rod shape structural members 605 that are arranged around the innermost solid cylinder shape structural member 604, and a second layer of tubular or rod shape structural members 606 that are arranged around the first layer such that the two layers are concentric. An outermost shell 607 is also shown which can also be a structural member or simply a housing for the structural members. The different structural members can be bonded together to form the disclosed hybrid core. As illustrated, the innermost structural member 604 may be used to achieve the high saturation point of the transducer while a plurality of different tubular- or rod-shaped structural members 605 and 606 may be used to achieve high sensitivity and SNR of the transducer, or even to reduce or rebalance the nonlinearity of the core permeability. The three structural members can be made from different magnetic materials. Alternatively, the two structural members 605 and 606 can be made from same magnetic material but different from the material of the innermost structural member 604.

Figure 7:
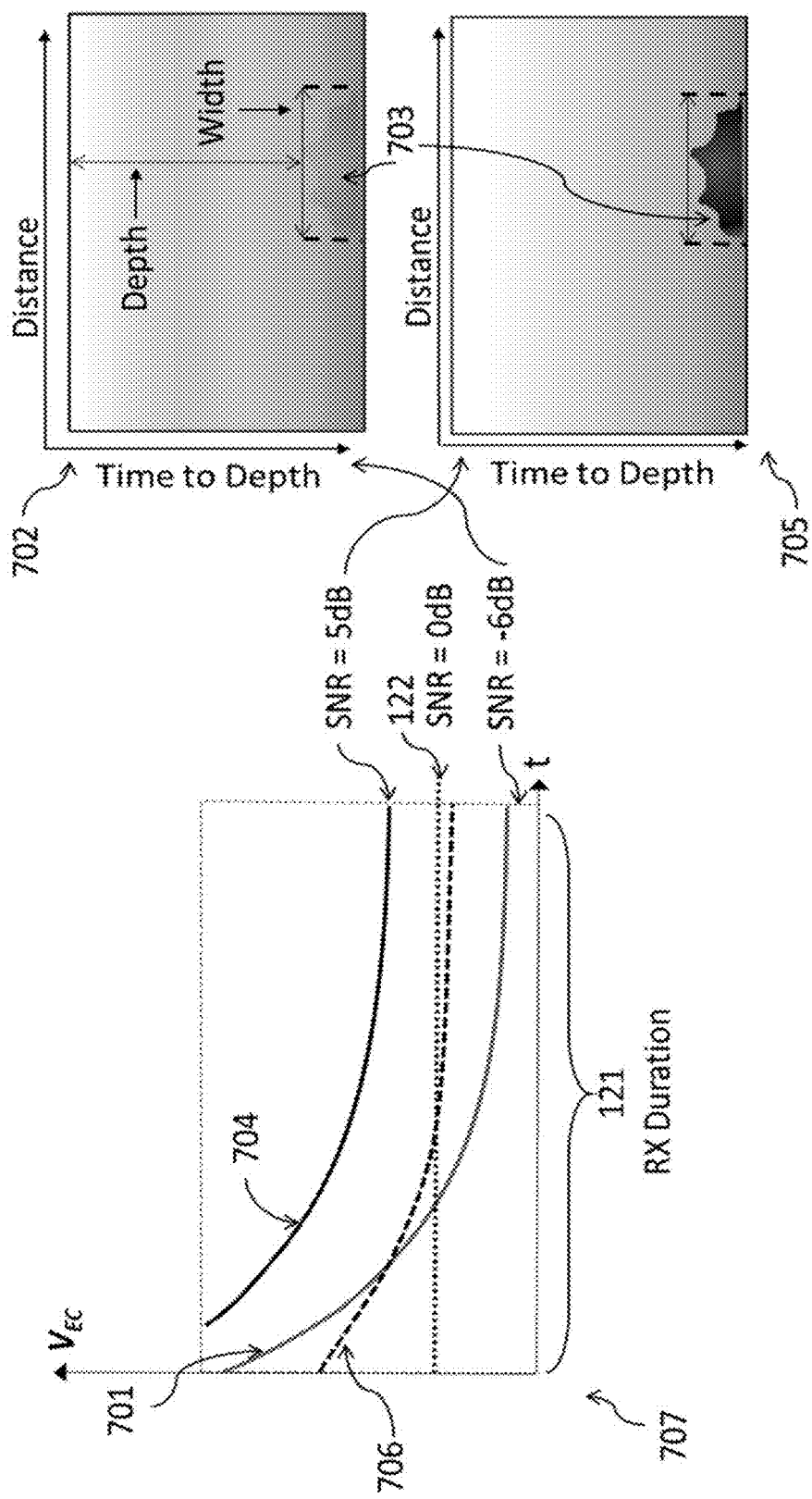
FIG. 7 compares performances of a conventional ferromagnetic core and the disclosed hybrid core, according to an exemplary embodiment of the present invention.

FIG. 7 illustrates a graphical comparison of performances of the inductive transducer apparatus using a standalone ferromagnetic core versus the disclosed hybrid core. Conventional cores allow a transducer to possess either a high saturation point or a high sensitivity. The disclosed hybrid core possesses both properties i.e., high saturation point and high permeability that enhances the transducer's performance. As illustrated in a voltage decay graph 707, a voltage decay curve 701 corresponding to decaying EC along the depth 111 of the metallic object 105 is shown for a single-core inductive transducer apparatus. The said apparatus may be selected with a core composed of SiFe compound whose properties are depicted in FIG. 4. Such material may possess a high saturation point but may not possess high enough permeability which would impact its sensitivity and SNR for the reception of the $H_{EC}$ field. Any other ferromagnetic materials with high saturation point could be chosen as the particular comparison graph is meant to be merely illustrative of the differences between known and the disclosed hybrid core performances. As seen in 701, the high saturation point of the SiFe core allows the generation of strong EC 107 on the surface during the charging period 116 which generates a strong $H_{EC}$ field resulting in a high peak voltage response 701 at the beginning of the decay curve. However, lack of high permeability of the SiFe core results in poor sensitivity and SNR behavior along depth as illustrated. This results in very low SNR for the received voltage signal that rapidly decreases and crosses the 0 dB noise floor level 122 corresponding to measuring magnetic field changes deep inside the target 105, which renders the transducer unusable for deep flaw detection applications due to low SNR and sensitivity. On the other hand, the conventional core may be chosen to possess high sensitivity in response to the $$\frac{dH_{EC}}{dt}.$$

Such a core behavior is illustrated in curve 706. The material of such a core may be chosen to be NiFe whose properties are depicted in FIG. 4, which possesses high permeability but may not possess a high enough saturation point. Any other ferromagnetic materials with high permeability may be chosen as the particular comparison graph is meant to be merely illustrative of the differences between known cores and the disclosed hybrid core. As seen, the response to the $$\frac{dH_{EC}}{dt}$$

changing held along the penetrated depth of EC is highly sensitive. However, lower saturation point of this material results in the weaker initial magnetic field B0 106 which does not induce strong enough EC to penetrate deep into the target 105. As the result of damping and diffusion along with time and depth 111 inside the target 105, EC is unable to reach the defect located very deep such as in 703 and thus the deep flaw detection is impossible. The disclosed hybrid magnetic core measurement response curve 704 is illustrated and offers a clear view of the advantages of the preferred embodiments of the invention. As shown, the disclosed hybrid core may possess both the high saturation point and the high sensitivity of the transducer. As seen in curve 704, due to the high saturation point, stronger EC 107 is induced as the result of the stronger initial magnetic field $B_0$ 106. It enables EC to reach the flaw 703 located deep underneath the surface of the target 105. Meanwhile, the hybrid core's high permeability allows the signal to remain highly sensitive to flux distribution changes $$\frac{dH_{EC}}{dt}$$

and maintain a positive SNR that keeps the signal above the system noise floor 122 across the entire acquisition window 121, which enables detection of the flaw 703 without the dominant noises present as illustrated in 705 as compared to 702 when conventional ferromagnetic cores are used for the transducer design.

Figure 8:
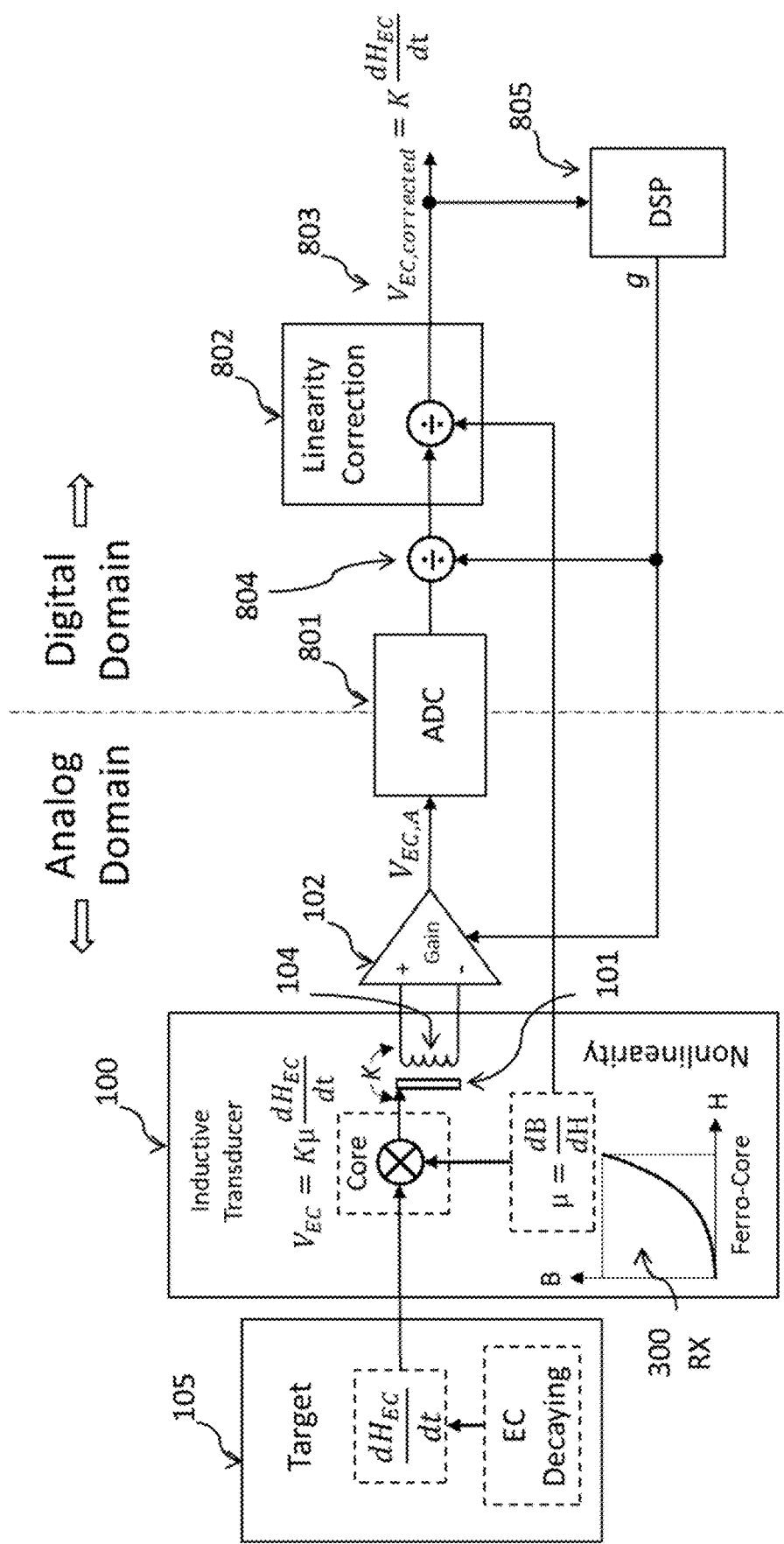
FIG. 8 is a block diagram illustrating a post-processing domain to correct for the nonlinearity of the received signal from RX coil that arises due to variable permeability of the core, according to an exemplary embodiment of the present invention.

FIG. 8 illustrates a method and process for achieving signal linearity in the post-processing domain. As mentioned earlier, the voltage response 112 developed on the RX coil 104 from the target 105 follows Lenz's law shown in equation (1). The ferromagnetic core's permeability $\mu_C$ is not a constant value and varies depending on the B-H curve properties of the material during the RX period 300 shown in FIG. 3. It can then be said that if the number of turns and section area of the core are kept constant as per engineering specifications, the equation (1) becomes $$v_{EC} = K\mu_C \frac{dH_{EC}}{dt} \quad (4)$$

where $$K = NA$$

where the $\mu_C$ introduces a variable gain, shown in equation (3), where the permeability $\mu_C$ is a function of input magnetic field $H_{EC}$ for the signal output $v_{EC}$ in the measurement system. Such behavior requires correction as it introduces a transducer response nonlinearity. Such a correction is made possible in the post-processing domain as illustrated. When the voltage signal $v_{EC}$ is processed through the electrical network 102 and is converted into the digital signal using the analog to digital converter (ADC) stage 801, an intentional circuit gain g may be introduced by stage 102 which may need de-gaining at 804 prior to linearity compensation processing 802. This circuit gain g is constant and can be removed by applying de-gaining process 804 that is controlled by a digital signal processing (DSP) controller 805. In following stage, data may require a linearity correction compensation stage 802 that is able to remove the variable gain factor introduced by $\mu_C$ so that the output voltage 803 follows $$v_{EC,corrected} = K\frac{dH_{EC}}{dt} \quad (5)$$

The linearity compensation can remove the variable gain factor arising from variable core permeability by building a permeability response matrix from test cases conducted in a controlled environment such as a lab and then dividing the response of the input signal by that known matrix.

Figure 9:
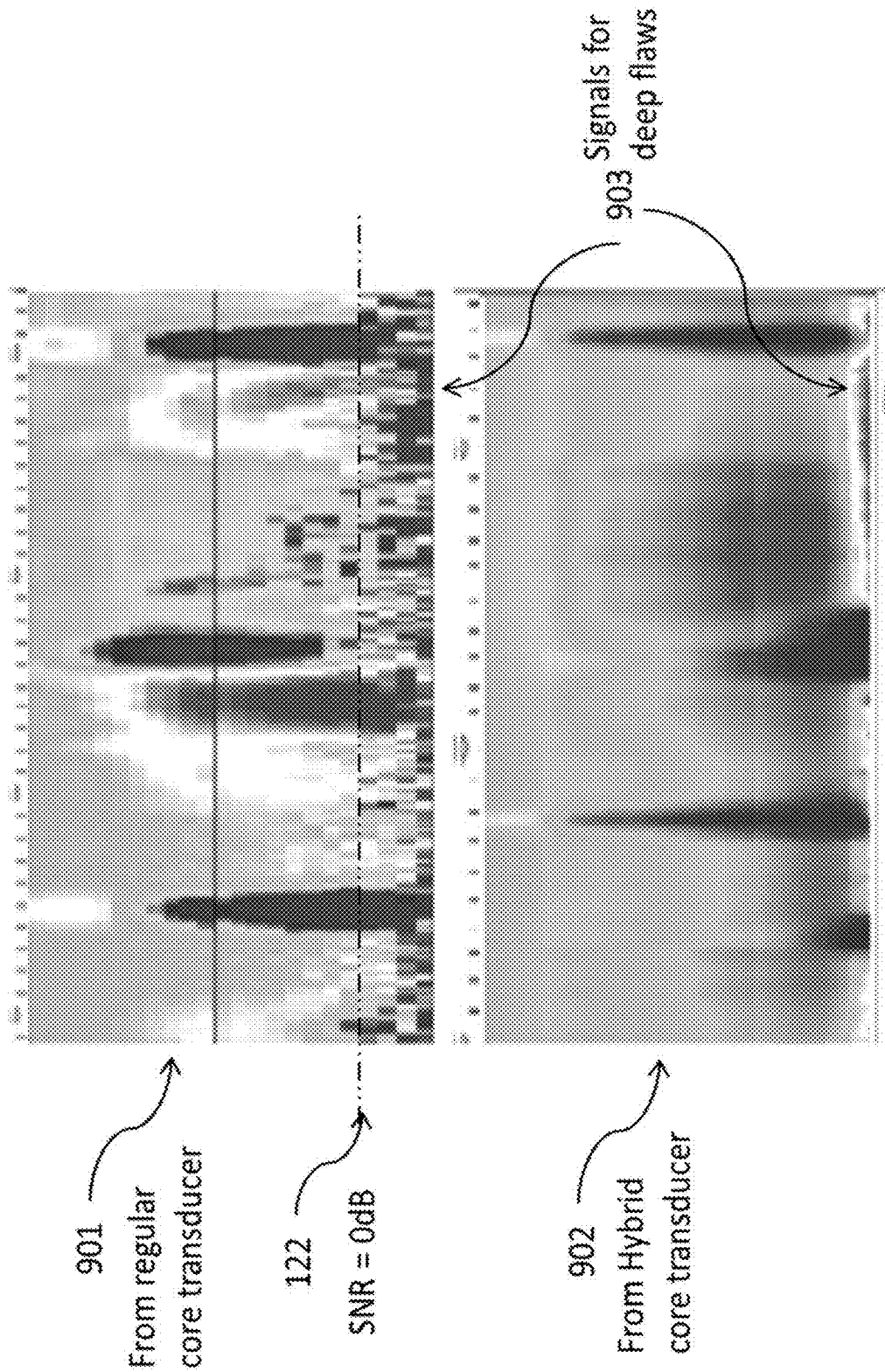
FIG. 9 shows a comparison of the lab test results from an inductive transducer with a regular core and an inductive transducer with the hybrid core, using the same acquisition measurement system, according to an exemplary embodiment of the present invention.

FIG. 9 illustrates the comparison from the lab tests from a transducer with a conventional core shown in graph 901 and the disclosed hybrid core shown in graph 902, using the same measurement system. On one hand, the 0 dB SNR line 122 is obvious on the conventional core result 901 in which any signals from the target features may not be identified clearly once the signal goes below the 0 dB line 122. On the other hand, the test results from the disclosed hybrid core are clear without heavy random noise contaminations. The 0 dB line is below the target depth boundary. So, the signals for deep flaws are shown clearly. By comparing the lab test results, the performances of the transducer with a hybrid core are much better than the one with a regular core.

It should be understood that although the preferred embodiments of the present invention have been described thoroughly and in great detail, various changes and modifications may be allowed without departing from the fundamental principle of the present invention as defined in the respective claims section.

What is claimed is:

1. An inductive transducer apparatus for non-destructive Pulsed Eddy Current testing of metallic objects comprising:
    a transmitter coil;
    a receiver coil; and
    a hybrid core, wherein the transmitter coil and the receiver coil are wound around the hybrid core, the hybrid core comprises a plurality of structural members arranged in a predetermined manner, each structural member of the plurality of structural members is juxtaposed to at least one structural member of the plurality of structural members, wherein at least two structural members of the plurality of structural members are made from different magnetic materials,
    wherein the plurality of structural members comprises a first structural member, a plurality of second structural members, and a plurality of third structural members, wherein the first structural member is in a form of a solid cylindrical core, the plurality of second structural members and the plurality of third structural members are rods, wherein the plurality of second structural members are arranged around the first structural member, the plurality of third structural members are arranged around the plurality of second structural members.

2. The inductive transducer apparatus according to claim 1, wherein the first structural member is made from a magnetic material different than that of the plurality of second structural members and the plurality of third structural members, wherein the first structural member has a higher saturation point and a lower magnetic permeability compared to the plurality of third structural members and the plurality of second structural members.

3. The inductive transducer apparatus according to claim 2, wherein the plurality of second structural members and the plurality of third structural members are made from different magnetic materials.

4. A hybrid core for an inductive transducer apparatus comprising:
   a plurality of structural members arranged in a predetermined manner, each structural member of the plurality of structural members is juxtaposed to at least one structural member of the plurality of structural members, wherein at least two structural members of the plurality of structural members are made from different magnetic materials, wherein the hybrid core is configured such that a transmitter coil and a receiver coil can be wound around the hybrid core,
   wherein the plurality of structural members comprises a first structural member, a plurality of second structural members, and a plurality of third structural members, wherein the first structural member is in a form of a solid cylindrical core, the plurality of second structural members and the plurality of third structural members are rods, wherein the plurality of second structural members are arranged around the first structural member, the plurality of third structural members are arranged around the plurality of second structural members.

5. The hybrid core according to claim 4, wherein the first structural member is made from a magnetic material different than that of the plurality of second structural members and the plurality of third structural members, wherein the first structural member has a higher saturation point and a lower magnetic permeability compared to the plurality of third structural members and the plurality of second structural members.

6. The hybrid core according to claim 5, wherein the plurality of second structural members and the plurality of third structural members are made from different magnetic materials.

7. A method for non-destructive Pulsed Eddy Current testing of metallic objects, the method comprising:
   providing a hybrid core for an inductive transducer apparatus, the hybrid core comprising:
      a plurality of structural members arranged in a predetermined manner, each structural member of the plurality of structural members juxtaposed to at least one structural member of the plurality of structural members, wherein at least two structural members of the plurality of structural members are made from different magnetic materials,
      wherein the plurality of structural members comprises a first structural member, a plurality of second structural members, and a plurality of third structural members, wherein the first structural member is in a form of a solid cylindrical core, the plurality of second structural members and the plurality of third structural members are rods, wherein the plurality of second structural members are arranged around the first structural member, the plurality of third structural members are arranged around the plurality of second structural members; and
   wounding a transmitter coil and a receiver coil around the hybrid core.

8. The method according to claim 7, wherein the method further comprises:
   applying linearity compensation to an output of the inductive transducer apparatus so as to compensate for a nonlinear behavior of the hybrid core.

* * * * *